United States Patent
Shin et al.

(10) Patent No.: US 9,318,034 B2
(45) Date of Patent: Apr. 19, 2016

(54) LIGHT SOURCE MODULE AND BACKLIGHT UNIT

(71) Applicant: SAMSUNG ELECTRONICS CO., LTD., Suwon-si (KR)

(72) Inventors: Chang Ho Shin, Incheon (KR); In Je Sung, Paju (KR); Sung Oh Ahn, Suwon (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 125 days.

(21) Appl. No.: 13/721,818

(22) Filed: Dec. 20, 2012

(65) Prior Publication Data

US 2013/0163228 A1 Jun. 27, 2013

(30) Foreign Application Priority Data

Dec. 21, 2011 (KR) ........................ 10-2011-0139237

(51) Int. Cl.
*G09F 13/04* (2006.01)
*F21V 9/00* (2015.01)
*G02F 1/1335* (2006.01)

(52) U.S. Cl.
CPC . *G09F 13/04* (2013.01); *F21V 9/00* (2013.01); *G02F 1/133603* (2013.01); *G02F 2001/133613* (2013.01)

(58) Field of Classification Search
CPC ........................................... G02F 2001/133613
USPC ........................ 362/231, 84, 249.01, 249.02
See application file for complete search history.

(56) References Cited

U.S. PATENT DOCUMENTS

| | | | |
|---|---|---|---|
| 7,052,152 B2 * | 5/2006 | Harbers et al. | 362/30 |
| 7,967,652 B2 | 6/2011 | Emerson | |
| 8,721,096 B2 * | 5/2014 | Park | 362/23.09 |
| 2008/0030985 A1 * | 2/2008 | Jeon et al. | 362/231 |
| 2008/0036940 A1 * | 2/2008 | Song et al. | 349/61 |
| 2008/0122832 A1 * | 5/2008 | Chen et al. | 345/214 |
| 2009/0147501 A1 * | 6/2009 | Chang et al. | 362/97.3 |
| 2010/0296269 A1 * | 11/2010 | Huang et al. | 362/97.3 |
| 2010/0315012 A1 * | 12/2010 | Kim et al. | 315/185 R |

(Continued)

FOREIGN PATENT DOCUMENTS

| | | |
|---|---|---|
| JP | 2000047606 A * | 2/2000 |
| JP | 2002094120 A * | 3/2002 |

(Continued)

OTHER PUBLICATIONS

Machine Translation, JP 2008-078365.*

(Continued)

*Primary Examiner* — Evan Dzierzynski
*Assistant Examiner* — Christopher E Dunay
(74) *Attorney, Agent, or Firm* — Sughrue Mion, PLLC

(57) ABSTRACT

A light source module includes: a substrate; and a plurality of light emitting devices having different ranks and arranged on the substrate in columns and rows, the plurality of light emitting devices being classified in the different ranks based on at least one of color coordinates, brightness of light emitted therefrom and a driving voltage, wherein in at least one of the columns and rows, light emitting devices having different ranks from among the plurality of light emitting devices are alternated in a basic arrangement and are alternated in an inverse arrangement opposite to the basic arrangement.

14 Claims, 4 Drawing Sheets

(56) References Cited

U.S. PATENT DOCUMENTS

| | | | |
|---|---|---|---|
| 2011/0069511 A1* | 3/2011 | Chen et al. | 362/612 |
| 2012/0236532 A1* | 9/2012 | Koo et al. | 362/84 |
| 2012/0243221 A1* | 9/2012 | Takagi et al. | 362/231 |
| 2013/0193862 A1* | 8/2013 | Sasano | 315/192 |
| 2013/0288404 A1* | 10/2013 | Nonomura | 438/16 |

FOREIGN PATENT DOCUMENTS

| | | | |
|---|---|---|---|
| JP | 2008078365 A * | 4/2008 | |
| JP | 4395801 B2 | 1/2010 | |
| JP | 2010087064 A * | 4/2010 | |
| JP | 2011113941 A * | 6/2011 | |
| KR | 10-2011-0108705 A | 10/2011 | |

OTHER PUBLICATIONS

Machine Translation, JP 2000-047606.*
Machine Translation, JP 2010-087064.*
Machine Translation, JP 2002-094120.*
Machine Translation, JP 2011-113941.*

* cited by examiner

LIGHT SOURCE MODULE AND BACKLIGHT UNIT

CROSS-REFERENCE TO RELATED APPLICATION

This application claims the priority of Korean Patent Application No. 10-2011-0139237 filed on Dec. 21, 2011, in the Korean Intellectual Property Office, the disclosure of which is incorporated herein by reference.

BACKGROUND

1. Field

Exemplary embodiments relate to a light source module and a backlight unit.

2. Description of the Related Art

A light-emitting diode (LED) is a type of a semiconductor light emitting device that produces various colors of light through the recombination of electrons and holes at an interface between p and n type semiconductors when current is applied thereto. An LED has advantages in various properties such as a long lifespan, low power consumption, excellent initial driving characteristics, a high vibration resistance, and the like, as compared to filament-based light emitting devices, and thus demand therefore is continuously increasing. In particular, a group III nitride semiconductor able to emit blue light of a single wavelength region has been prominent.

Although a cold cathode fluorescent lamp (CCFL) has been used as a light source module in an LCD backlight unit in the related art, a CCFL containing mercury vapor may cause environmental pollution, may have a slow response speed, low color reproduction, and may not be appropriate for use with a small, thin and light LCD panel. Compared to a CCFL, an LED is environmentally-friendly, has a high speed response rate measured on the level of several nanoseconds, is effective in displaying streaming video signals, is impulsively driven, has color reproducibility of over 100%, and can optionally change a level of brightness, a color temperature, or the like of emitted light by adjusting an amount of light emitted by red, green, and blue LEDs, as well as having strengths suitable for the light, thin, and small LCD panels, and thus, LEDs have recently been employed in backlight light source modules in a positive manner.

The light source module used in the backlight unit, or the like may include a plurality of light emitting devices. The plurality of light emitting devices may have different characteristics such as varying levels of brightness, different required driving voltages, disparate color coordinates and the like during a manufacturing process. That is, manufactured light emitting devices are grouped into ranks according to the above characteristics. In this case, when a module is implemented by using light emitting devices having the same rank, since final product quality may be variable, a method of implementing the module uses light emitting devices having different ranks. As such, when light emitting devices having different ranks are applied to a single module, light emitting characteristics thereof may not be uniform across an overall light emission surface.

SUMMARY

One or more exemplary embodiments provide a light source module able to emit light in a uniform manner when light emitting devices having different characteristics, i.e., ranks, are applied to one module.

One or more exemplary embodiments also provide a backlight unit including the light source module.

According to an aspect of exemplary embodiment, there is provided a light source module including: a substrate; and a plurality of light emitting devices having different ranks and arranged on the substrate in columns and rows, the plurality of light emitting devices being classified in the different ranks based on at least one of color coordinates, brightness of light emitted therefrom and a driving voltages, wherein in at least one of the columns and rows, light emitting devices having different ranks from among the plurality of light emitting devices are alternated in a basic arrangement and are alternated in an inverse arrangement opposite to the basic arrangement.

A last light emitting device in the basic arrangement may be disposed adjacent to a first light emitting device in the inverse arrangement.

The plurality of light emitting devices may be arranged symmetrically with respect to a center of the columns and the rows having the basic arrangement and the inverse arrangement.

In the columns and the rows having the basic arrangement and the inverse arrangement, both light emitting devices disposed at the ends of each of the columns and the rows may have a same rank and both light emitting devices disposed in a center of each of the columns and the rows may have a same rank.

In the columns and the rows having the basic arrangement and the inverse arrangement, the rank of both light emitting devices disposed in a center of each of the columns and the rows may be different from the rank of both light emitting devices disposed at the ends of each of the columns and the rows.

In the columns and the rows having the basic arrangement and the inverse arrangement, the both light emitting devices disposed in the center of columns and rows may have the same rank.

The columns and the rows may be provided in plural, and all of the plurality of columns and rows may have the basic arrangement and the inverse arrangement.

In this case, the four light emitting devices disposed in a center of a region formed by the plurality of columns and rows may have the same rank.

The plurality of light emitting devices may have two different ranks.

The plurality of light emitting devices may have three or more different ranks.

The plurality of light emitting devices may have a distribution of characteristics that is a basis for the ranks indicating a normal distribution.

The ranks may be classified based on an average of the normal distribution.

According to an aspect of another exemplary embodiment, there is provided a backlight unit including: a substrate; a plurality of light emitting devices having different ranks and arranged on the substrate in columns and rows, the plurality of light emitting devices being classified in the different ranks based on at least one of color coordinates, brightness of light emitted therefrom and a driving voltage; and at least one optical sheet disposed on the plurality of light emitting devices, wherein in at least one of the columns and rows, light emitting devices having different ranks from among the plurality of light emitting devices are alternated in a basic arrangement and are alternated an inverse arrangement opposite to the basic arrangement.

The backlight unit may further include a chassis structure accommodating the substrate and the plurality of light emitting devices.

A last light emitting device in the basic arrangement may be disposed adjacent to a first light emitting device in the inverse arrangement.

The plurality of light emitting devices may be arranged symmetrically with respect to a center of the columns and the rows having the basic arrangement and the inverse arrangement.

In the columns and the rows having the basic arrangement and the inverse arrangement, both light emitting devices disposed at the ends of each of the columns and the rows have a same rank and both light emitting devices disposed in a center of each of the columns and the rows have a same rank.

In the columns and the rows having the basic arrangement and the inverse arrangement, both light emitting devices disposed in the center of columns and rows may have the same rank and have different ranks from those of the both light emitting devices disposed at the ends of columns and rows.

In the columns and the rows having the basic arrangement and the inverse arrangement, the both light emitting devices disposed in the center of columns and rows may have the same rank.

The columns and the rows may be provided in plural, and all of the plurality of columns and rows may have the basic arrangement and the inverse arrangement.

In this case, the four light emitting devices disposed in a center of a region formed by the plurality of columns and rows may have the same rank.

The plurality of light emitting devices may have a distribution of characteristics that is a basis for the ranks indicating a normal distribution.

In this case, the ranks may be classified based on an average of the normal distribution.

BRIEF DESCRIPTION OF THE DRAWINGS

The above and other aspects will be more clearly understood from the following detailed description taken in conjunction with the accompanying drawings, in which.

DETAILED DESCRIPTION

Figure 1:
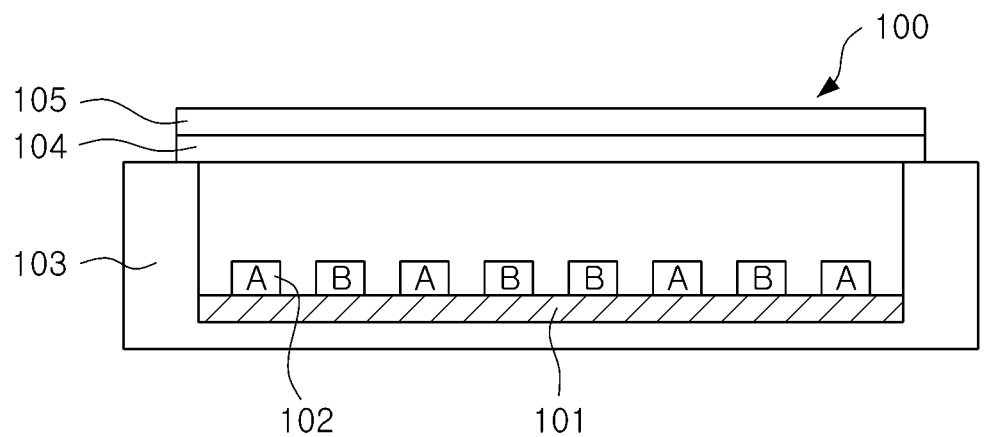
FIG. 1 is a schematic cross-sectional view of a light source module according to an exemplary embodiment.

Exemplary embodiments will now be described in detail with reference to the accompanying drawings.

The inventive concept may, however, be implemented in many different forms and should not be construed as being limited to the embodiments set forth herein. Rather, these embodiments are provided so that this disclosure will be thorough and complete, and will fully convey the scope of the invention to those skilled in the art. Thus, shapes and sizes of the elements in the drawings may be exaggerated for more clarity.

Figure 2:
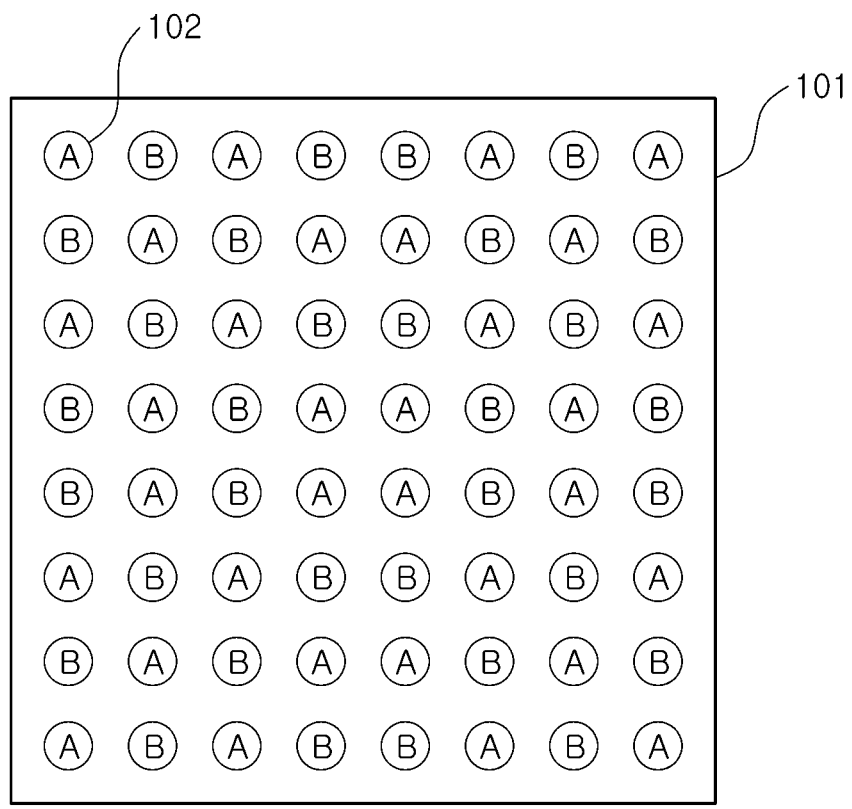
FIGS. 2, 4, and 5 are schematic plan views illustrating arrangements of light emitting devices included in the light source module of FIG. 1 according to exemplary embodiments.
Figure 3:
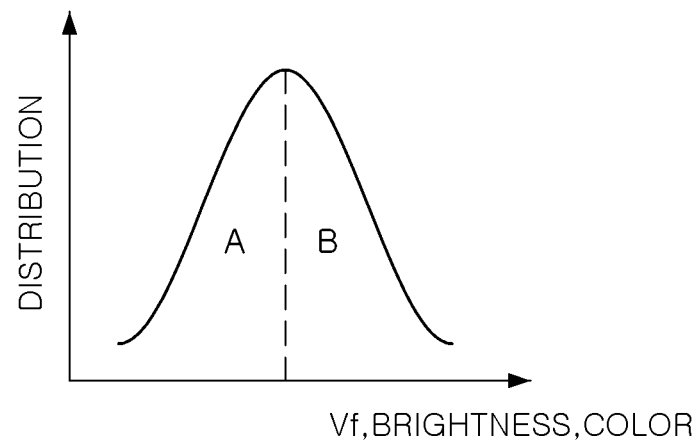
FIG. 3 is a graph of an example of distribution of light emitting devices classified according to a driving voltage, brightness, and a color rank.
Figure 4:
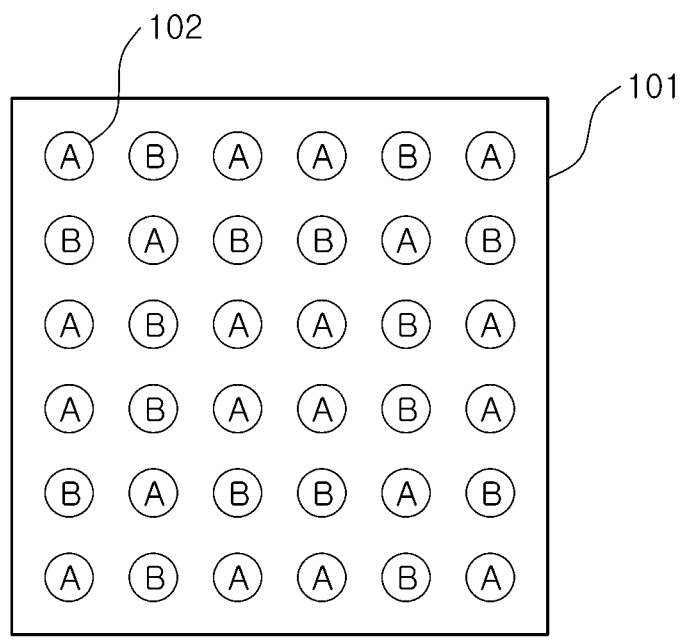
Figure 5:
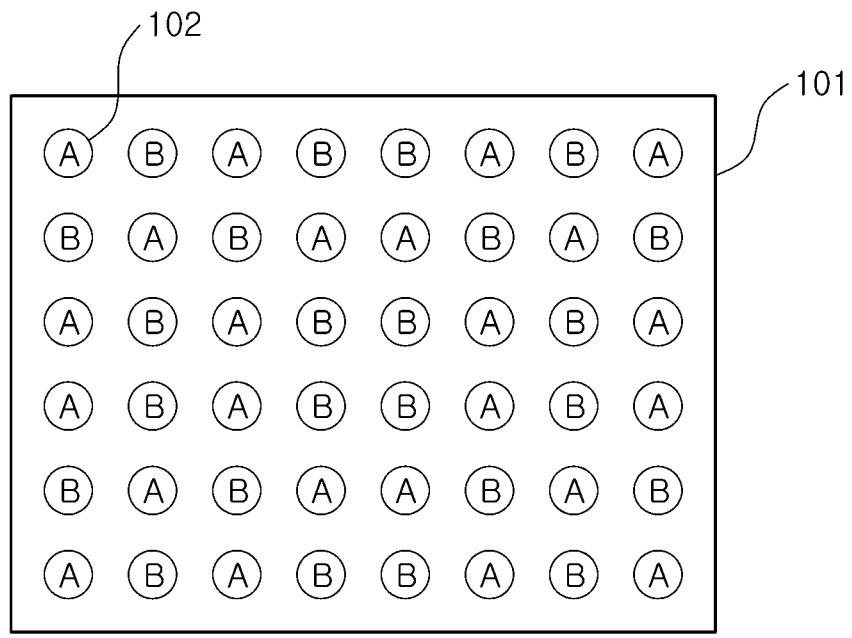
Figure 6:
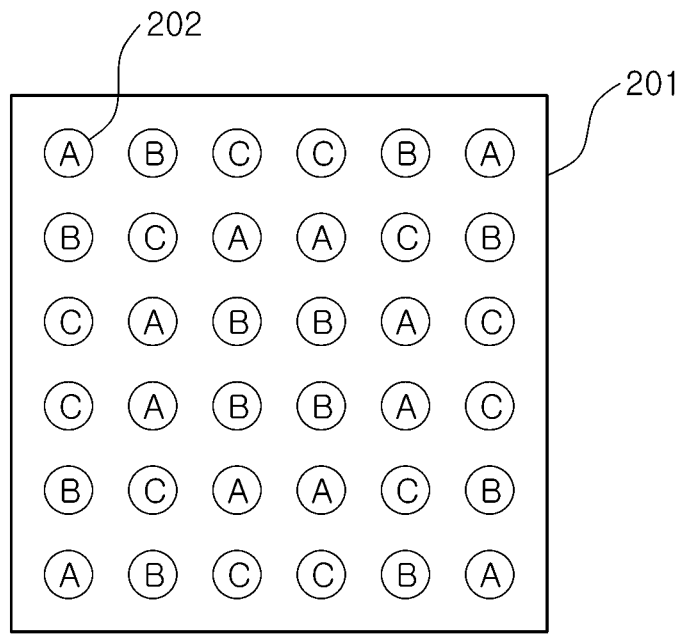
FIGS. 6 and 8 are schematic plan views illustrating arrangements of light emitting devices included in a light source module according to exemplary embodiments.
Figure 7:
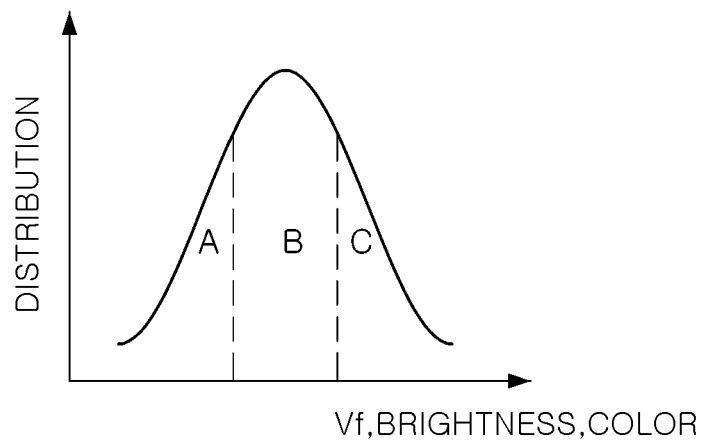
FIG. 7 is a graph of another example of distribution of light emitting devices classified according to a driving voltage, brightness, and a color rank.
Figure 8:
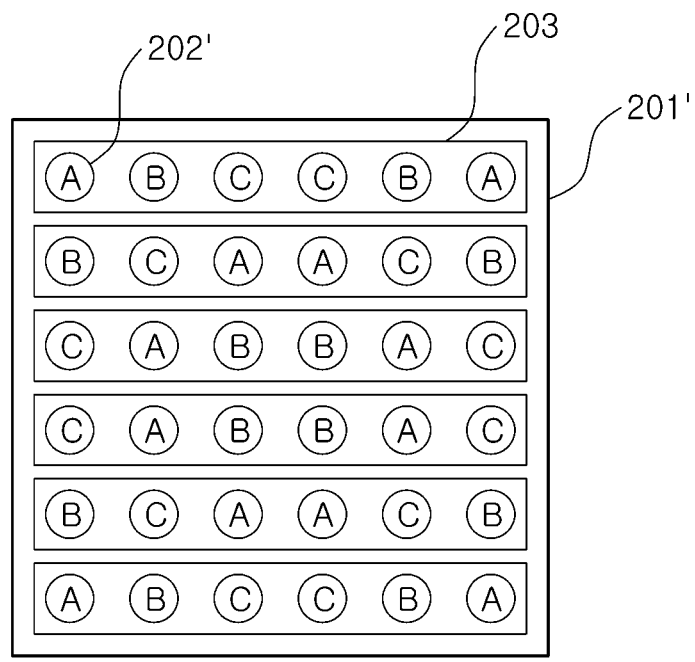

FIG. 1 is a schematic cross-sectional view of a light source module 100 according to an exemplary embodiment. FIGS. 2, 4, and 5 are schematic plan views illustrating arrangements of light emitting devices 102 included in the light source module 100 of FIG. 1 according to exemplary embodiments. FIG. 3 is a graph of an example of distribution of the light emitting devices 102 classified according to a driving voltage Vf, brightness, and a color rank. FIGS. 6 and 8 are schematic plan views illustrating arrangements of light emitting devices 202 and 202' included in a light source module according to exemplary embodiments. FIG. 7 is a graph of another example of distribution of the light emitting devices 202 classified according to the driving voltage Vf, brightness, and a color rank.

Referring to FIGS. 1 and 2, the light source module 100 according to the present exemplary embodiment has a structure including a substrate 101 and the plurality of light emitting devices 102. In addition, the light source module 100 includes an additional structure for a backlight unit, or the like and may include a chassis structure 103 accommodating the substrate 101 and the light emitting devices 102 and optical sheets 104 and 105 disposed over the light emitting devices 102. In this case, the optical sheets 104 and 105 may include diffusion sheets or prism sheets, or the like.

The substrate 101 may be a circuit board such as a printed circuit board (PCB), a metal core PCB (MCPCB), a metal (MPCB), a flexible PCB (FPCB), or the like may be used, and the substrate 101 may include a wire pattern on a surface and an inside thereof. The wire pattern may be electrically connected to the light emitting devices 102. Also, one or more connectors may be formed on the substrate 101 in order to transmit an electrical signal to or receive an electrical signal from the outside.

The plurality of light emitting devices 102 may be any devices that emit light, and may be light-emitting diodes (LEDs). The plurality of light emitting devices 102 may emit light having a predetermined wavelength and then emit white light. To this end, the plurality of light emitting devices 102 may be combined with devices that emit light of different colors or may include wavelength conversion materials such as fluorescent materials.

In the present exemplary embodiment, as shown in FIG. 2, the plurality of light emitting devices 102 are arranged in rows and columns, and have different ranks A and B. Also, the plurality of light emitting devices 102 having the different ranks A and B are arranged in an alternating manner in the rows and/or columns. Such an alternative arrangement corresponds to a basic arrangement. For example, the basic arrangement is A, B, A, and B with respect to a first row of FIG. 2, and is B, A, B, and A with respect to a second row of FIG. 2.

Referring to FIG. 3, the plurality of light emitting devices 102 have ranks classified based on at least one of the color coordinates, the brightness of light emitted therefrom and the driving voltage Vf. The plurality of light emitting devices 102 manufactured before the light source module 100 is configured do not have the same characteristics such as the color coordinates or brightness of light emitted therefrom and the driving voltage Vf but, as shown FIG. 3, have a distribution similar to a normal distribution. The plurality of light emitting devices 102 having the above distribution may be divided into two groups on a predetermined basis, for example, an average in the distribution. The plurality of light emitting devices 102 corresponding to the two groups have the respective ranks of A and B. The plurality of light emitting devices 102 having different ranks are selected and alternated, thereby generally exhibiting a uniform characteristic across an overall light emitting side.

Although the distribution or ranks of the plurality of light emitting devices 102 is determined before the plurality of light emitting devices 102 are mounted on the substrate 101, the distribution of the plurality of light emitting devices 102 mounted on the substrate 101 may also be similar to the normal distribution. In this case, although it may be difficult to determine the respective ranks of the light emitting devices 102 from the plurality of light emitting devices 102 mounted on the substrate 101, when an average value of the characteristics such as the color coordinates or brightness of light emitted therefrom and the driving voltage Vf, or an average of the normal distribution, is used as a basis for dividing the ranks of the plurality of light emitting devices 102, a rank A (or B) may be assigned to the light emitting devices 102 having values smaller than the average, and a rank B (or A) may be assigned to the light emitting devices 102 having values greater than the average.

Arrangements of the plurality of light emitting devices 102 will now be described in detail with reference to FIG. 2. The plurality of light emitting devices 102 have an inverse arrangement in which at least one of rows and columns is arranged in an order opposite to that of the basic arrangement. For example, a first column and a first row have a basic arrangement of A, B, A, and B, and an inverse arrangement of B, A, B, and A. In addition, a second column and a second row have a basic arrangement of B, A, B, and A, and an inverse arrangement of A, B, A, and B. In this case, the inverse arrangement may be disposed adjacent to the last light emitting device in the basic arrangement.

Accordingly, the ranks of the light emitting devices 102 are arranged in the order of A, B, A, B, B, A, B, and A in the first column and the first row, and the ranks of the light emitting devices 102 are arranged in the order of B, A, B, A, A, B, A, and B in the second column and the second row. These arrangements are made in such a manner that the plurality of light emitting devices 102 are arranged symmetrically with respect to the center of rows and columns. As will later be described, the light emitting devices 102 are arranged according to their ranks so as to have the basic arrangement and the inverse arrangement thereto, and thus uniformity of light emitting sides may be further enhanced. Although all rows and columns have the basic arrangement and the inverse arrangement in FIG. 2, as occasion demands, some rows and columns only having the basic arrangement and the inverse arrangement may be employed.

In the arrangements of the plurality of light emitting devices 102 of the present exemplary embodiment, the two light emitting devices 102 disposed in the center have the same rank in the rows and columns having the basic arrangement and the inverse arrangement. For example, the two light emitting devices 102 disposed in the center have the rank B in the first column and the first row. The two light emitting devices 102 disposed in the center have the rank A in the second column and the second row. As another characteristic of the arrangements of the plurality of light emitting devices 102, the two light emitting devices 102 disposed at the ends of columns and rows have the same rank in the rows and columns having the basic arrangement and the inverse arrangement. For example, the two light emitting devices 102 disposed at the ends of columns and rows have the rank A in the first column and the first row. The two light emitting devices 102 disposed at the ends of columns and rows have the rank B in the second column and the second row. As another characteristic of the arrangements of the plurality of light emitting devices 102, the four light emitting devices 102 disposed in the center of a region formed by the whole arrangements forming light emitting sides, i.e. a plurality of rows and columns, may have the same rank (the rank A in the present embodiment).

As described above, in the arrangement described above, the light emitting devices 102 having the same rank are disposed at the ends of columns and rows in one row or column. Also, the two adjacent center light emitting devices 102 have the same rank in such a manner that the light emitting devices 102 having the same rank are disposed at the ends of columns and rows, and the same number of the light emitting devices 102 having the different ranks A and B are disposed as a whole. The light emitting devices 102 disposed at the ends of columns and rows in a specific row and column have the same rank in terms of characteristics such as color coordinate or brightness of light emitted therefrom and driving voltage Vf, and thus the characteristics may be uniform in an edge region of a light emitting side. That is, a color stain or a brightness stain may be significantly reduced in the edge region of the light emitting side.

A relatively small mixing of light occurs in the edge region of the light emitting side, and thus uniformity is secured by using light emitting devices 102 having the same rank. In a center region of the light emitting side, although light emitting devices 102 having the same rank are disposed adjacent to each other, a relatively great mixture of light may occur, and a color stain or a brightness stain may barely occur from the entirety of the light emitting side. In other words, in the present exemplary embodiment, the light emitting devices 102 having the same rank are disposed in a corner having a weak light mixture, while the light emitting devices 102 having different ranks are disposed in a center region having a strong light mixture, and thus a uniform light emitting characteristic may exhibit in the whole of the light emitting side.

The arrangements of the light emitting devices 102 may be modified as shown in FIGS. 4 and 5. As shown in FIG. 4, an odd number of the light emitting devices 102 may have a basic arrangement. For example, a first column and a first row may have a basic arrangement of A, B, and A, and an inverse arrangement of B, A, and B. Also, as shown in FIG. 5, a light emitting side has basically the same arrangements as shown in FIG. 2 but has different numbers of columns and rows. As described above, the arrangements of columns and rows having the basic arrangement and the inverse arrangement provided by the exemplary embodiment may modify and employ the number of light emitting devices included in each column and row and the number of columns and rows in various ways.

Although the light emitting devices are classified into two ranks in the previous embodiments, an arrangement of light emitting devices classified into three or more ranks may be used. That is, in a light source module according to another exemplary embodiment of FIG. 6, a plurality of light emitting devices 202 arranged on a substrate 201 have ranks A, B, and C classified based on the characteristics of the color coordinates or brightness of light emitted therefrom and driving voltage Vf. In this case, as shown in FIG. 7, each rank may be divided with respect to a predetermined reference value. In the case of three or more ranks (three ranks in the present exemplary embodiment), the arrangement basis as described above may be applied. For example, a first column and a first row have a basic arrangement of A, B, and C, and an inverse arrangement of C, B, and A Likewise, a second column and a second row have a basic arrangement of B, C, and A, and an inverse arrangement of A, C, and B. A third column and a third row have a basic arrangement of C, A, and B, and an inverse arrangement of B, A, and C. In the present embodiment, the light emitting devices 202 having the same rank are also disposed at the ends of columns and rows in each column and row, and the light emitting devices 202 having the same rank but having the ranks different from those provided at the ends of columns and rows may be disposed in the center.

Although light emitting devices are directly mounted on a substrate in the previous embodiment of FIG. 1, as shown in FIG. 8, the light emitting devices 202' may be mounted on a sub substrate 203, and the sub substrate 203 may be mounted on a substrate 201'. In this case, the sub substrate 203 may be provided for each of the light emitting devices 202' forming one column, or may be provided for each of the light emitting devices 202' forming one row. However, the inventive concept is not limited to a particular shape of the sub substrate 203 provided for each of the light emitting devices 202' forming columns and rows, but the sub substrate 203 may be provided in various manners, for example, the adjacent two light emitting devices 202' only may be mounted on the sub substrate 203.

As set forth above, according to the exemplary embodiments, a light source module able to emit light in a uniform manner may be obtained when light emitting devices having different characteristics, i.e., ranks, are applied to one module. In particular, such a uniform light emitting characteristic may be greatly enhanced at an edge region of a light emitting side. Also, a backlight unit including the light source module may be obtained.

However, the effect produced from the exemplary embodiments is not limited thereto. Even though not expressly mentioned, the units of the aspects of the exemplary embodiments described above or the purpose or the effect understood from the exemplary embodiments may be included therein.

While exemplary embodiments have been shown and described, it will be apparent to those skilled in the art that modifications and variations can be made without departing from the spirit and scope of the inventive concept as defined by the appended claims.

What is claimed is:

1. A light source module comprising:
a substrate; and
a plurality of light emitting devices having different ranks and arranged on the substrate in columns and rows, the plurality of light emitting devices being classified in the different ranks based on at least one of color coordinates, brightness of light emitted therefrom and a driving voltage,
wherein in at least one of the columns and the rows, light emitting devices having different ranks from among the plurality of light emitting devices are alternated in a basic arrangement and are alternated in an inverse arrangement opposite to the basic arrangement,
wherein both light emitting devices disposed at ends of each of the columns and the rows having the basic arrangement and the inverse arrangement have a same rank, and both light emitting devices disposed in a center of each of the columns and the rows have a same rank, and the rank of both light emitting devices disposed in a center of each of the columns and the rows is different from the rank of both light emitting devices disposed at the ends of each of the columns and the rows, and
wherein the number of light emitting devices having a rank and the number of light emitting devices having a rank different therefrom are the same in each of the columns and the rows.

2. The light source module of claim 1, wherein a last light emitting device in the basic arrangement is disposed adjacent to a first light emitting device in the inverse arrangement.

3. The light source module of claim 1, wherein the plurality of light emitting devices are arranged symmetrically with respect to a center of the columns and the rows having the basic arrangement and the inverse arrangement.

4. The light source module of claim 1, wherein four light emitting devices disposed in a center of a region formed by the columns and the rows have a same rank.

5. The light source module of claim 1, wherein the plurality of light emitting devices have a distribution of characteristics that is a basis for the ranks indicating a normal distribution, and the ranks are classified based on an average of the normal distribution.

6. A backlight unit comprising:
a substrate;
a plurality of light emitting devices having different ranks and arranged on the substrate in columns and rows, the plurality of light emitting devices being classified in the different ranks based on at least one of color coordinates, brightness of light emitted therefrom and a driving voltage; and
at least one optical sheet disposed on the plurality of light emitting devices,
wherein in at least one of the columns and the rows, light emitting devices having different ranks from among the plurality of light emitting devices are alternated in a basic arrangement and are alternated in an inverse arrangement opposite to the basic arrangement,
wherein both light emitting devices disposed at ends of each of the columns and the rows having the basic arrangement and the inverse arrangement have a same rank, and both light emitting devices disposed in a center of each of the columns and the rows have a same rank, and the rank of both light emitting devices disposed in a center of each of the columns and the rows is different from the rank of both light emitting devices disposed at the ends of each of the columns and the rows, and
wherein the number of light emitting devices having a rank and the number of light emitting devices having a rank different therefrom are the same in each of the columns and the rows.

7. The backlight unit of claim 6, further comprising a chassis structure accommodating the substrate and the plurality of light emitting devices.

8. The backlight unit of claim 6, wherein a last light emitting device in the basic arrangement is disposed adjacent to a first light emitting device in the inverse arrangement.

9. The backlight unit of claim 6, wherein the plurality of light emitting devices are arranged symmetrically with respect to a center of the columns and the rows having the basic arrangement and the inverse arrangement.

10. The backlight unit of claim 6, wherein four light emitting devices disposed in a center of a region formed by the columns and the rows have a same rank.

11. The backlight unit of claim 6, wherein the plurality of light emitting devices have a distribution of characteristics that is a basis for the ranks indicating a normal distribution, and the ranks are classified based on an average of the normal distribution.

12. A light source module comprising:
a substrate; and
a plurality of light emitting devices that are classified in different ranks based on characteristics thereof, and are disposed on the substrate in columns and rows, wherein in at least one of the columns and the rows, light emitting devices of the plurality of light emitting devices are arranged in a first group and a second group adjacent to the first group, wherein in the first group, light emitting devices having different ranks are alternately arranged in a first order, and wherein in the second group, light emitting devices having different ranks are alternately arranged in a second order that is opposite to the first order, wherein a first light emitting device in the first group and a last light emitting device in the second group are disposed at opposite ends of the at least one of the columns and the rows and have a same rank, and a last light emitting device in the first group and a first light emitting device in the second group are disposed in a center of the at least one of the columns and the rows and have a same rank, and the rank of the last light emitting device in the first group and the first light emitting device in the second group is different from the rank of the first light emitting device in the first group and the last light emitting device in the second group, and wherein the number of light emitting devices having a rank and the number of light emitting devices having a rank different therefrom are the same in the at least one of the columns and the rows.

13. The light source module of claim 12, wherein the characteristics of the light emitting devices comprise at least one of color coordinates, brightness of light emitted therefrom and a driving voltage.

14. The light source module of claim 12, wherein a last light emitting device in the first group and a first light emitting device in the second group are adjacent to each other and have a same rank.

* * * * *